Oct. 8, 1957  G. A. LYON  2,809,075
WHEEL COVER
Filed March 3, 1953  2 Sheets-Sheet 1
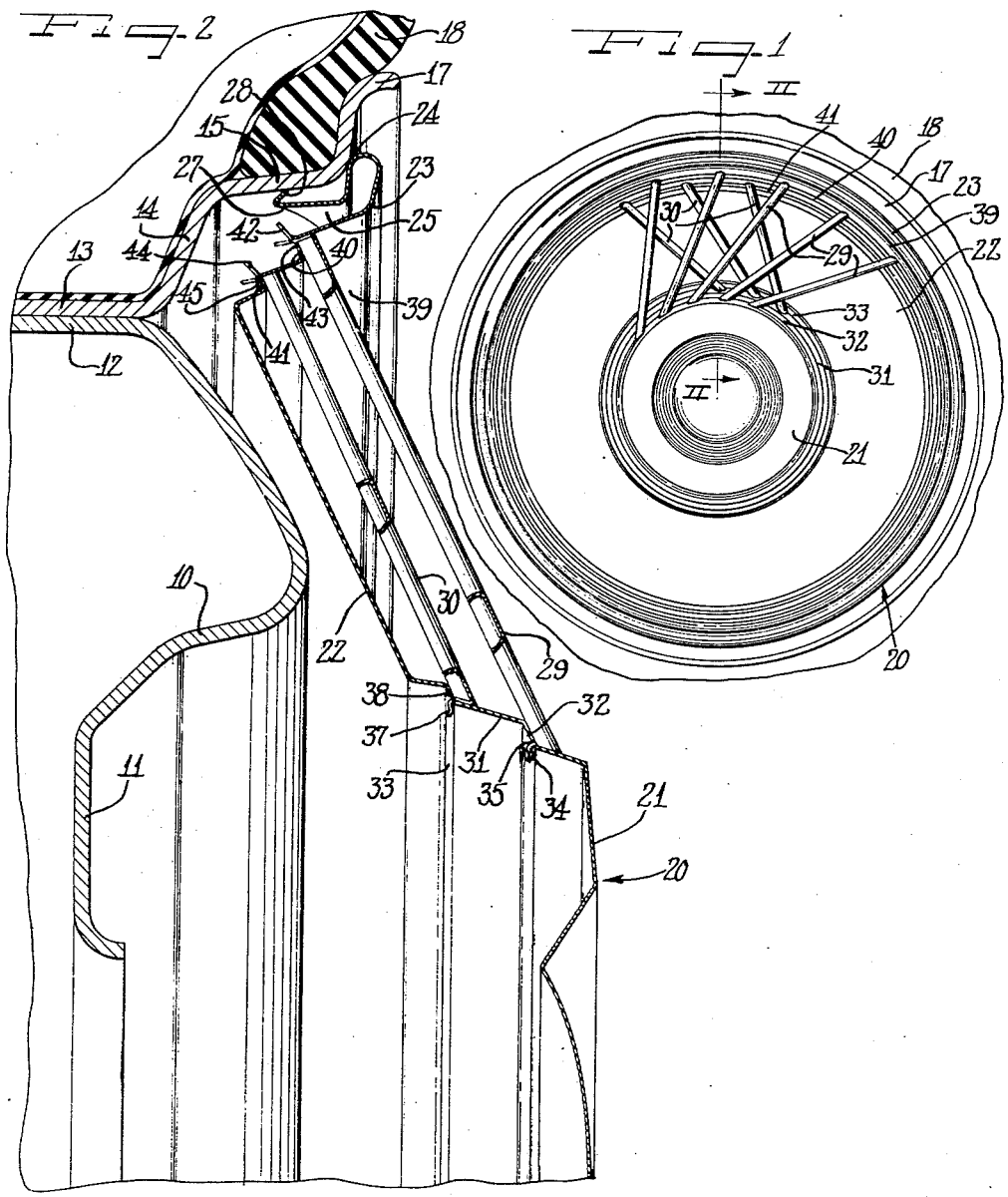
Inventor
George Albert Lyon Oct. 8, 1957 G. A. LYON 2,809,075
WHEEL COVER
Filed March 3, 1953 2 Sheets-Sheet 2
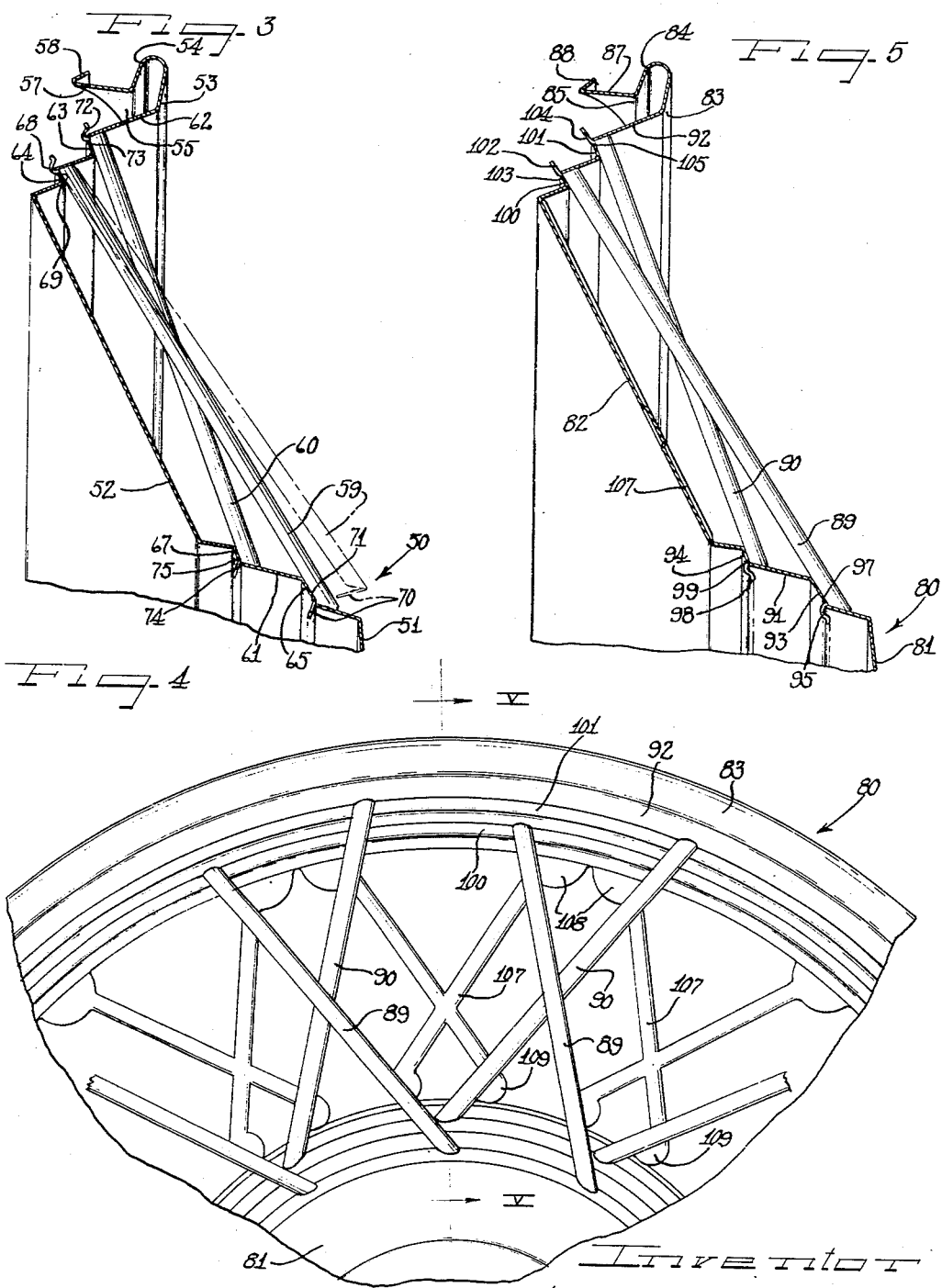
Inventor
George Albert Lyon

United States Patent Office 2,809,075
Patented Oct. 8, 1957

2,809,075

WHEEL COVER

George Albert Lyon, Detroit, Mich.

Application March 3, 1953, Serial No. 339,979

1 Claim. (Cl. 301—37)

The present invention relates to improvements in wheel structures and more particularly concerns the ornamental and protective covering of the outer sides of vehicle wheels.

An important object of the present invention is to provide an improved wheel structure having at the outer side thereof a wheel cover that has spoke simulating means thereon.

Another object of the invention is to provide a self-retaining wheel cover which is provided with spoke simulating means.

Another object of the invention is to provide a wheel cover which is imperforate and substantially wholly covers the outer side of a vehicle wheel, but has a realistic spoke simulating means thereon.

A further object of the invention is to provide a wheel cover that has novel spoke elements attached thereto.

It is a further object of the invention to provide a drawn full disk wheel cover that has an arrangement of crossing spoke simulating elements secured thereto.

Yet another object of the invention is to provide a wheel cover having a combination of embossed and attached spoke simulating means thereon.

Other objects, features and advantages of the present invention will be readily apparent from the following detailed description of certain preferred embodiments thereof taken in conjunction with the accompanying drawings in which:

Figure 1 is a side elevational view of a wheel structure embodying features of the invention;

Figure 2 is an enlarged fragmentary radial sectional detail view taken substantially on the line II—II of Figure 1;

Figure 3 is a fragmentary radial sectional detail view through a modified cover construction;

Figure 4 is a fragmentary face elevational view of a further modified wheel cover; and Figure 5 is a fragmentary radial sectional view taken substantially on the line V—V of Figure 4.

A vehicle wheel with which the present invention is adapted to be used may be of the disk spider-type having a wheel body or spider 10 which may comprise a stamping of suitable heavy gauge sheet metal including a central bolt-on flange 11 and an outer peripheral attachment flange 12. A multi-flange, drop center type tire rim having a base flange 13 is supported by the wheel body by attachment of the marginal flange 12 to the base flange. The tire rim includes a side flange 14, an intermediate generally radially and axially outwardly directed flange 15 and a terminal flange 17. The tire rim is adapted to support a tire and tube assembly 18.

Applied to the outer side of the wheel is a wheel cover 20 which is preferably dimensioned to cover entirely the wheel body 10 and substantially all of the tire rim. To this end, the cover 20 comprises a sheet metal disk stamped to shape and appropriately externally finished. The sheet metal may comprise stainless steel, brass or the like.

The wheel cover 20 comprises a central crown portion 21, an intermediate annular portion 22 and an outer marginal annular portion 23. The outer annular portion 23 may be provided with means for attachment of the cover to the wheel, in the present instance comprising an underturned outer marginal flange 24 having a generally axially inwardly extending resilient flange 25 which is adapted to lie spaced inwardly in assembly from the intermediate flange 15 of the tire rim and has a series of eight or sixteen or other preferred number of retaining finger extensions 27 each of which is provided with a short and stiff generally radially and axially outwardly extending tire rim gripping terminal flange 28. The terminal flanges 28 engage the intermediate flange 15 of the tire rim under resilient tension of the retaining finger extensions 27 and the flange 25 to maintain a thorough retaining engagement with the tire rim intermediate flange. This enables the cover to be pressed home into place on the wheel by axially inward pressure until the underturned flange 24 engages the tire rim terminal flange 17. Removal of the cover is effected by inserting a pry-off tool such as a screw driver behind the underturned marginal finishing and reinforcing flange 24 and applying pry-off leverage to the margin of the cover.

In order to provide a substantial chamber axially outwardly from the bolt-on flange 11 in order to accommodate the hub portion of an axle structure of a vehicle to which the wheel may be applied, the crown portion 21 of the cover 20 is disposed substantially axially outwardly relative to the intermediate portion 22 of the cover. Herein, also, the intermediate portion 22 is inset with respect to the outer marginal portion 23 of the cover and thus defines an annular axially outwardly opening groove of substantial width between the crown portion 21 and the outer marginal portion 23. This feature is utilized to advantage for ornamental purposes.

According to the present invention, means simulating spokes of a wire spoke wheel are provided in overlying relation to the intermediate portion 22 of the cover. For this purpose, two series of spoke-like elements, 29 and 30 are provided to extend between the crown portion 21 and the radially outer marginal portion 23 of the cover. Herein the spoke elements 29 and 30 are made from sheet metal and are thus of hollow tubular or semi-tubular construction, being shown as of half-round shape but may be of full round or three-quarter round shape if desired, thus affording maximum rigidity with minimum material and yet affording the appearance of heavy gauge wire such as may be used in a wire spoke wheel.

For attachment of the inner ends of the spoke elements 29 and 30 to the crown portion 21 of the wheel, the crown portion is provided with a stepped side wall 31 provided with respective radially offset, axially spaced reentrant respective axially outer and axially inner shoulders 32 and 33. It will be observed from Figure 2 that the outer shoulder 32 is spaced from but is adjacent to the peak of the crown 21, while the inner shoulder 33 is spaced back inwardly from the shoulder 32 but is spaced axially outwardly from the adjacent juncture of the side wall 31 with the intermediate portion 22 of the cover.

Before attachment of the ends of the spokes 29 to the shoulder 32, the inner ends of the spokes 29 are provided with return bent hook-like terminal flanges 34 which are engaged through respective slots 35 provided in the axially outwardly facing portions of the shoulder 32 adjacent to juncture with the radially outwardly facing adjacent reentrant portion of the wall 31. In each instance, in assembling the attachment flange 34 through its slot 35, the tip portion of the flange is inserted through the slot and the spoke element 29 rocked into engagement as its inner end portion with the shoulder 32, by interlocking the hook-like flange 34 with the inner margin defining the slot 35, and placing the flange 34 under tension.

Attachment of the spoke element 30 to the shoulder 33 is effected in similar manner, that is, respective hook-like attachment flanges 37 on the inner terminal portions of the spoke elements 30 are inserted through respective slots 38 provided therefor in the shoulder 33 adjacent to the reentrant juncture thereof with the side wall 31 of the crown portion of the cover. The turned end portions of the retaining and attachment flanges 37 are inserted through the respective slots 38 by endwise movement of the respective spoke elements 30 and the spoke elements are then swung down to bring the inner end portions thereof into engagement with the shoulder 33 and to place the respective retaining finger flanges 37 under resilient tension.

In order to secure the outer end portions of the spoke elements 29 and 30 to the cover, a generally axially and radially inwardly directed wall portion 39 is provided at the radially inner side of the outer annular cover portion 23 extending to juncture with the intermediate portion 22 of the cover which preferably extends generally frustoconically into the substantial axially outwardly opening groove defined between the outer side of the tire rim and the customary nose bulge of the wheel body 10. For receiving the outer ends of the spokes 29 and 30 the connecting wall portion 39 has respective axially spaced step-like axially outer and axially inner annular shoulders 40 and 41 which face generally axially outwardly. The spoke elements 29 have end extension flanges 42 which are originally substantially straight and directed axially inwardly so that as the outer ends of the spoke elements 29 are swung in against the shoulder 40, the flanges 42 will enter respective slots 43 therefor in the shoulder 40. The end portions of the retaining flanges 42 are then bent from the dash position to the full line position shown in Figure 2 to clench the flanges to the preferably radially outer margin defining the slots 43 through which the respective flanges extend. In similar fashion, the outer end portions of the spokes 30 are provided with terminal retaining flanges 44 which are projected through respective slots 45 in the shoulder 41 as indicated in dash outline in Figure 2 and are then clenched against the preferably radially outer side margin defining the aperture by bending the same angularly and radially outwardly as seen in full outline in Figure 2.

By having the inner end portion retaining flanges 34 and 37 of the spoke elements 29 and 30, respectively, stressed under tension in the full assembled relationship of the spoke elements, and thus held by the respective outer end retaining flanges 42 and 44, a tight rattle-free relationship of the spoke elements 29 and 30 to the cover is attained.

As best seen in Figure 1, the spoke elements 29 and 30 are preferably disposed in crossing relation, similarly to the wire spokes of a wire spoke wheel. To this end, the outermost row or series of spoke elements 29 may be angled in a generally clockwise direction from the crown portion 21 while the innermost row or series of spoke elements 30 is angled in counterclockwise direction from the crown portion 21.

In order to heighten the illusion of the cover being a wire spoke wheel structure, the intermediate cover portion 22 may be finished or painted in a dark or black color while the spoke elements 29 and 30 are of polished stainless steel or plated structure. On the other hand, if desired, the spoke elements 29 and 30 may be finished in any preferred color, while the intermediate portion 22 of the cover may be of a polished, lustrous finish to provide a complementary, contrasting background for the spoke elements. It will be observed that both the inner and the outer end portions of the spoke elements 30 are spaced axially inwardly from the inner and outer end portions, respectively, of the outer spoke elements 29.

In applying the cover 20 to the wheel, it is generally centered relative to the wheel and then pressed generally axially inwardly to cause the retaining fingers 27 to cam inwardly and enter into retaining engagement with the intermediate flange 15 of the tire rim. Removal of the cover is easily effected by applying a pry-off tool behind the rib-like underturned marginal flange 24 of the cover and exerting pry-off leverage to cause the retaining fingers to release their retaining engagement with the tire rim.

In the modification of Figure 3, a cover 50 is provided which in general respects may be the same as the cover 20. To this end the cover 50 comprises a drawn sheet metal body, such as stainless steel or brass plate provided with a central axially outwardly extending crown portion 51, an intermediate preferably generally frustoconical radially outwardly and axially inwardly sloping portion 52 and an outer annular marginal portion 53. An underturned marginal flange 54 on the cover provides a reinforcing and finishing bead structure and has a generally axially inwardly extending resilient flange portion 55 provided with generally axially inwardly extending retaining finger extensions 57 having short and stiff generally radially and axially outwardly directed cover retaining extension flanges 58 adapted to grippingly engage an intermediate flange of a tire rim of a wheel to which the cover may be applied.

In order to afford a generally wire wheel appearance for the cover 50, two annular series or sets of crossing spoke-like elements 59 and 60, respectively, are provided. The spoke elements 59 and 60 may be full or semi-tubular sheet metal strips which through this construction are substantially rigid.

To implement the wire wheel illusion, the inner end portions of the spokes are connected to a generally axially inwardly and radially outwardly sloping side wall portion 61 of the crown 51 merging angularly with the inner margin of the intermediate portion 52 of the cover, while the outer end portions of the spoke elements are connected to an inner side wall portion 62 of the marginal cover portion 53 extending generally axially inwardly and sloping radially inwardly and joining angularly with the outer margin of the intermediate cover portion 52. Axially spaced, stepped shoulders 63 and 64 are provided in the radially outer wall portion 62 for receiving the ends of the spokes, while the inner crown side wall portion 61 has stepped axially spaced shoulders 65 and 67 for receiving the inner end portions of the spoke elements.

In the cover 50, not only are the spoke elements 59 and 60 disposed in peripherally directed crossing relation, but also in axially directed cross relation. To this end, the outer end portions of the spoke elements 59 are connected in place with respect to the inner shoulder 64 of the outer side wall 62. For this purpose the outer end portions of the spoke elements 59 are provided with generally hook-shaped engagement flange extensions 68 which are secured through respective slots 69 in the shoulder 64. As shown in dash outline in Figure 3 the retaining flanges 68 are engaged in the slots 69 by inserting the tips of the flanges into the slots 69 by endwise movement of the spoke-like elements 59 and then rocking the spoke-like elements from the dot-dash outline position to the full outline position, thereby placing the flange extension 68 under tension into engagement with the margins defining the radially outer sides of the slots 69. As an incident to the inward rocking movement of the spoke elements 59, inner end retaining flange extensions 70 extending substantially straight axially inwardly are engaged through respective apertures 71 in the axially outer end of the shoulders 65 in the crown side wall 61. By preference the flanges 70, similarly as the flanges 42 of the cover 20 are angled slightly away from the tip portion of the spoke element 59 so that as the flanges 70 are directed toward the slots 71, the tips of flanges 70 will cam against the adjacent portion of the side wall 61 and be placed under tension as the inner end of the respective spoke element is swung toward engagement with the shoulder 65. After the spoke element 59 has engaged the shoulder 65, the terminal retaining flange 70 is clenched against the inner margin defining the slot 71.

Attachment of the spoke elements 60 is similarly effected, that is, by engaging respective hook-like retaining flanges 72 thereon through respective slots 73 provided in the axially outer shoulder 63 in the outer wall 62 and rocking the spoke elements 60 into position against the inner shoulder 67 of the inner or crown side wall 51 to engage under resilient tension inner terminal flanges 74 through appropriate apertures 75 in the shoulder 67. By clenching the inwardly projecting portions of the flanges 74 into engagement with inner margin defining the respective slots 75, firm, tensioned rattle-free retension of the spoke elements 60 is attained.

In the modification of Figures 4 and 5, a cover 80 is provided having a central crown portion 81, an intermediate generally frusto-conically radially outwardly and axially inwardly sloping portion 82 and an outer marginal annular portion 83. The outer portion 83 has an underturned outer marginal flange 84 rigidifying and finishing the same and provided with a generally axially inwardly extending inner resilient flange portion 85 having retaining finger extensions 87 provided with short and stiff generally radially and axially outwardly directed tire rim engaging retaining finger terminals 88.

The cover 80 is provided with two annular crossing series of spoke elements 89 and 90 connected between a generally axially inwardly and radially outwardly directed side wall portion 91 on the crown 81 joined angularly to the intermediate portion 82, and an inner side wall 92 on the inner side of the annular marginal portion 83 extending generally axially inwardly and radially inwardly and joined angularly to the outer margin of the intermediate portion 82 of the cover. The inner or crown side wall 91 has axially outer and axially inner stepped generally axially outwardly facing annular shoulders 93 and 94, respectively. At their inner end portions, the spoke elements 89 are secured in place against the outer shoulder 93 by the projection of hook-like end extension flanges 95 through respective slots 97 in the shoulder 93. The inner end portions of the spoke elements 90 are connected to the shoulder 94 by means of hook-shaped inner end retaining flange extensions 98 through respective slots 99 in the shoulder 94.

Attachment of the outer end portions of the spoke elements 89 and 90 is to respectively inner and outer stepped generally axially outwardly facing shoulders 100 and 101 in the outer side wall 92. The inner end portions of the spoke elements 89 are provided with flange extensions 102 extending through respective slots 103 in the shoulder 100 and clenched into engagement with the radially outer margin defining the slots. At their outer ends the spoke elements 90 are connected to the shoulder 101 by means of end extension retaining flanges 104 extending through respective slots 105 in the shoulder 101 and clenched into retaining engagement with the radially outer side margins defining the slots 105. It will be understood that the retaining flanges on the spoke elements 89 and 90 may be placed under resilient tension similarly as described hereinbefore for the spoke elements of the covers 20 and 50.

In addition to both peripheral angular and axially angular crossing orientation of the two sets of spoke elements 89 and 90, as indicated in Figures 4 and 5, and thus more or less simulating the wire spoke arrangement of certain types of wire spoke wheels, additional spoke simulating means may be provided in the form of spoke simulating embossments 107 in the intermediate portion 82 of the cover. In the form shown, the spoke embossments 107 are of generally crossing leg or X-shape having boss-like embossment portions 108 at juncture with the outer side wall 92, while the inner end portions of the embossed spoke legs may be provided with boss-like enlargements 109 at or adjacent juncture with the crown side wall 91. Thereby the illusion is provided of a third and fourth series of spokes behind the spoke elements 89 and 90.

If preferred, the spoke elements 89 and 90 and the spoke embossments 107 may be of polished or plated and burnished finish while the spaces between the spoke embossments 107 in the intermediate cover portion 82 may be painted black so as to heighten the impression of the cover being a wire spoke wheel. On the other hand, the spoke elements 89 and 90 and the spoke embossments 107 may be finished in any preferred color while the remainder of the cover may be of polished or plated and burnished finish.

In all forms of the cover it will be appreciated that the central hub portion of the cover and its side wall generally simulate the hub of a wire wheel, while the outer marginal portion of the cover and its inner side wall connecting with the intermediate portion of the cover affords the general impression of a tire rim, with the spoke elements connecting the hub simulating and tire rim simulating portions of the structure.

It will be understood that modifications and variations may be effected without departing from the scope of the novel concepts of the present invention.

I claim as my invention:

In a wheel cover for disposition at the outer side of a vehicle wheel, a sheet metal cover body having thereon means for attachment to the wheel and including a generally radially outwardly facing circular inner wall portion and a generally radially inwardly facing radially outer wall portion spaced from said inner wall portion and connected thereto by an inset dished or grooved intermediate portion, each of said walls having intermediately therein a step-like shoulder providing an annular generally axially outwardly facing ledge and a generally radially facing wall portion joined thereto, with slots at juncture of the ledge and wall portion, and a series of rigid sheet metal spoke elements having the respective opposite end portions resting against said respective ledges, the tips of the spoke elements being closely disposed adjacent to the respective wall portions so as to appear to emanate therefrom, the respective opposite end portions of the spoke elements having extending angularly generally axially inwardly and radially therefrom attachment flanges extending through said slots and turned to effect interlocking engagement behind said step-like shoulder flange portions and holding the spoke elements firmly against said ledges.

References Cited in the file of this patent

UNITED STATES PATENTS

| | | |
|---|---|---|
| D. 168,977 | Ryerson | Mar. 3, 1953 |
| D. 170,232 | Plotkin | Aug. 18, 1953 |
| 1,819,865 | Brennen | Aug. 18, 1931 |
| 1,958,484 | Lyon | May 15, 1934 |
| 2,069,952 | Hoffman | Feb. 9, 1937 |
| 2,709,114 | Plotkin | May 24, 1955 |

FOREIGN PATENTS

| | | |
|---|---|---|
| 714,587 | France | Sept. 7, 1931 |
| 769,819 | France | June 18, 1934 |